United States Patent [19]

Nolf

[11] 4,413,922
[45] Nov. 8, 1983

[54] BRANCH-OFF SEAL

[75] Inventor: Jean M. E. Nolf, Hamme-Mille, Belgium

[73] Assignee: N.V. Raychem S.A., Kessel-Lo, Belgium

[21] Appl. No.: 265,733

[22] Filed: May 21, 1981

[30] Foreign Application Priority Data

May 22, 1980 [GB] United Kingdom ............... 8016951

[51] Int. Cl.³ .............................................. F16B 2/12
[52] U.S. Cl. ...................................... 403/341; 29/447;
24/339; 24/459; 156/85; 174/88 R; 174/DIG. 8; 248/68 R; 403/273
[58] Field of Search ......................... 29/883, 884, 447;
174/88 R, DIG. 8; 24/255 R, 261 C, 336, 339;
248/68 R; 403/273; 156/85

[56] References Cited

U.S. PATENT DOCUMENTS 3,258,822 7/1966 Schlesch .
3,266,764 8/1966 Briles .
3,894,706 7/1975 Mizusawa .
4,246,687 1/1981 Nolf ....................................... 29/447
4,298,415 11/1981 Nolf ....................................... 156/85

FOREIGN PATENT DOCUMENTS 684743 11/1939 Fed. Rep. of Germany .
2413623 2/1975 Fed. Rep. of Germany .

Primary Examiner—Howard N. Goldberg
Assistant Examiner—Carl J. Arbes
Attorney, Agent, or Firm—Herbert G. Burkard; T. Gene Dillahunty; Edith A. Rice

[57] ABSTRACT

A clamping member for forming a branch-off seal between a recoverable sleeve and more than one substrate extending from an end of the sleeve, comprises at least two interengageable parts that define channels. The parts are assembled on the end of the sleeve such that the clamping member defines ducts for the substrates. Use of a clamping member having interengageable parts, rather than an integral member, makes fixing at the end of the sleeve easier.

16 Claims, 8 Drawing Figures

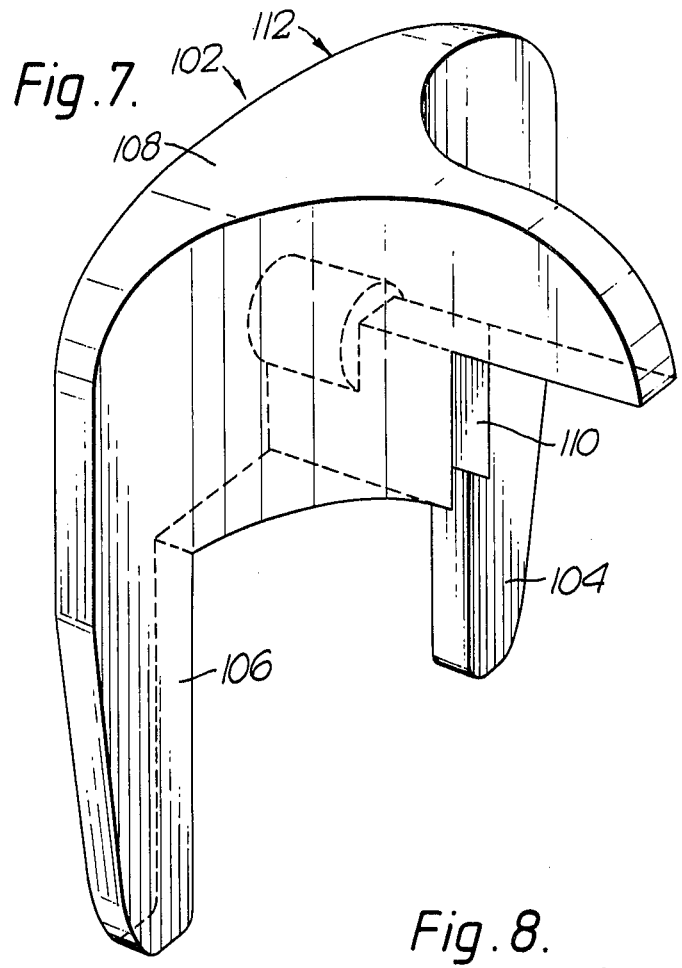
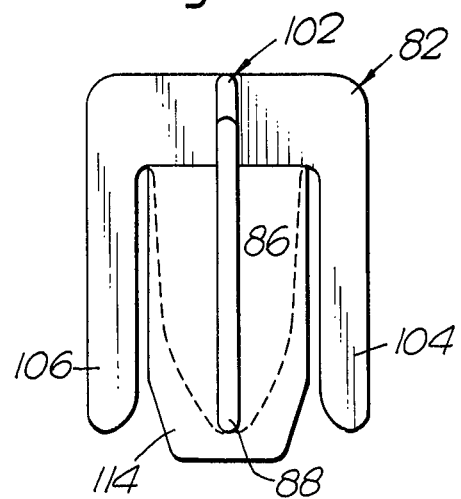

BRANCH-OFF SEAL

DESCRIPTION

This invention relates to a branch-off seal and, in particular, to a clamping member for use in forming a branch-off seal between a recoverable, for example heat-recoverable, sleeve and a plurality of substrates extending from an end thereof.

A clamping member of the kind described above is disclosed in our U.K. patent application Publication No. 2019120A, and has a closed end with two or more projections extending therefrom generally parallel to each other. Channels are defined between the legs, and the clamping member, or clip as it is usually referred to, fits over the end of the sleeve with the sleeve extending into the channels.

The sleeve may be of integral tubular construction or may be a wraparound, and may enclose a branch-off joint between substrates such as telecommunications cables. The clip is mounted at the end of the sleeve where the cables branch off and is arranged to urge at least two spaced portions of the sleeve end together or towards each other so as to form two or more ducts at the sleeve end around the branch-off cables. When the sleeve is heated for recovery thereof, the clip prevents pulling away of the sleeve from the region between the cables, thus improving the seal at the branch-off.

In some instances, for example where three of four, or more, substrates extend from the sleeve, difficulty may be experienced in fitting such a known clip over the end of the sleeve. In the case of a four cable branch-off, for example, a five-legged clip is employed, whereby a central leg thereof has to be introduced between the four cables and four circumferentially-spaced portions of the sleeve to be urged into channels between that leg and the other legs to divide the interior of the sleeve into four ducts, each containing one cable.

It is one object of the present invention to provide a clamping member that overcomes or at least reduces the above-mentioned installation difficulties. In accordance with the present invention, there is provided a clamping member for use in forming a branch-off seal between a recoverable sleeve and a plurality of substrates extending from an end thereof, the clamping member comprising at least two interengageable parts that define at least one channel, whereby the parts are capable of being assembled on said one end of the sleeve with circumferentially-spaced portions of the sleeve disposed within said at least one channel and with the clamping member defining within the sleeve at least two ducts for the substrates.

The clamping member of the present invention allows one part thereof to be fitted over a sleeve end to form at least two ducts for branched-off substrates, and this can be completed by the assembly on to the one part of one or more other parts of the clamping member. Thus the above-mentioned difficulty is reduced by avoiding the necessity of disposing all of the channels of a clamping member having two or more channels over the sleeve end simultaneously. Furthermore, the engagement of the channel or all of the channels over the sleeve end simultaneously with insertion of a leg into the sleeve can also be avoided. In addition, it will be appreciated that a clamping member in accordance with the broadest aspect of the present invention, ie being formed of two parts defining a single channel, will also be advantageous in certain branch-off applications.

Some or all of said parts of the clamping member may comprise legs that extend generally parallel to each other from a closed end or head of the assembled member, with the or each channel extending between adjacent legs. The parts of the clamping member may be arranged to interengage by sliding together, and the sliding interengagement may take place in a direction generally parallel to the channel-or leg- direction, or generally transversely thereto. If friction within the sliding interengagement is insufficient to prevent disengagement of the parts of the sleeve, then means may be provided to this end.

Preferably, the clamping member is arranged so as to define four ducts so that one cable or other substrate may be located in each duct.

Several embodiments of clamping members or clip, each in accordance with the present invention, will now be described, by way of example, with reference to the accompanying drawings, in which:

FIGS. 6 and 7 show respectively the two parts of a third embodiment of clip; and FIG. 8 shows an elevation of the assembled clip of the third embodiment, on a reduced scale.

Figures 1, 2, 3:
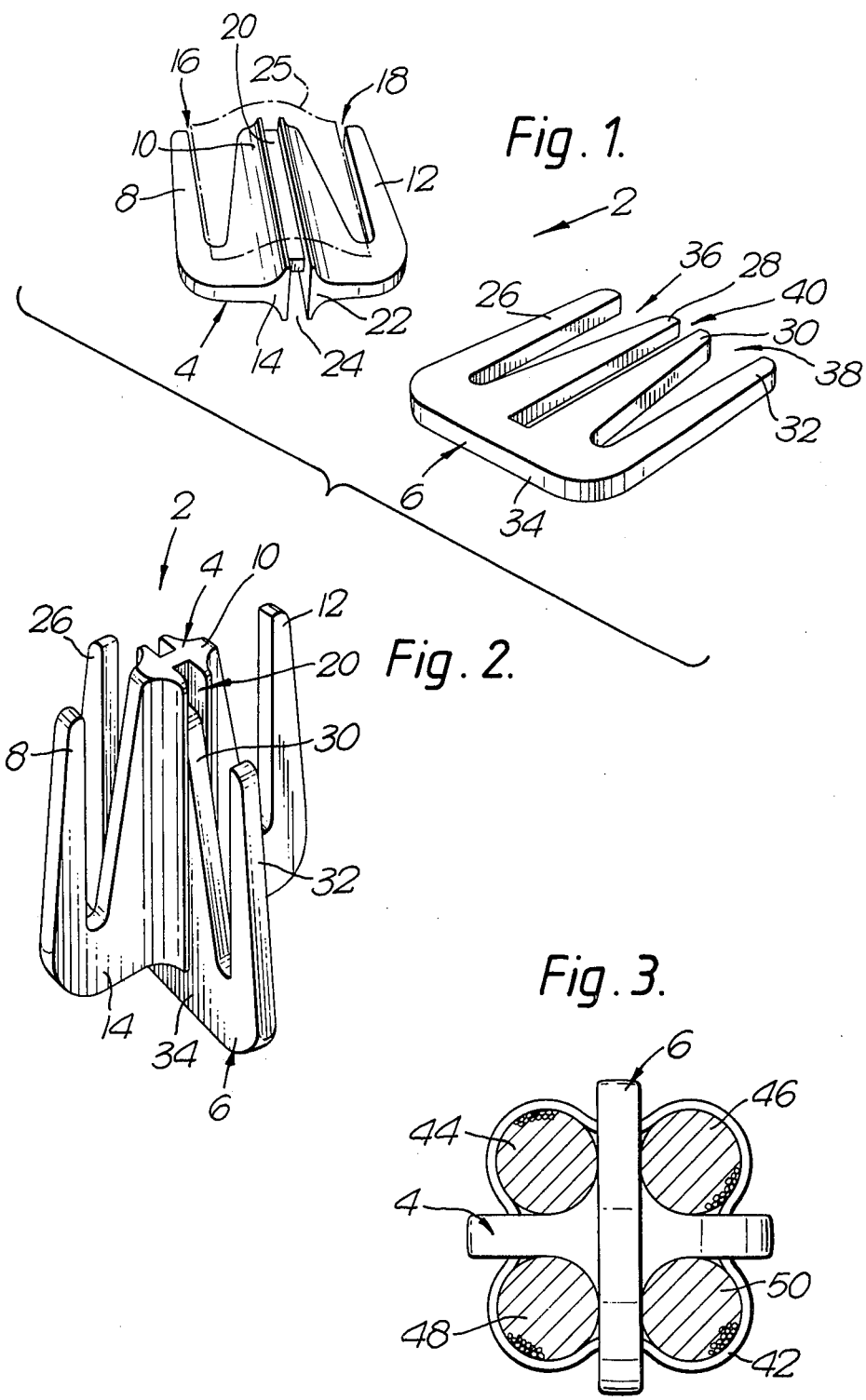
FIG. 1 is a perspective view of the parts of a first embodiment, which is a two part clip, before assembly.
FIG. 2 is a perspective view of the almost-completely assembled clip of the first embodiment.
FIG. 3 is and end view of an assembled clip of the first embodiment, mounted on a sleeve.

The clip 2 of FIGS. 1 and 2 comprises two interengageable parts 4 and 6. Part 4 of the clip 2 has three legs 8, 10, 12 that extend generally parallel to each other and generally in a plane away from a closed head portion 14. The leg 10 forms respective channels 16 and 18 with the legs 8 and 12 for receiving, in use, circumferentially-spaced portions of an end of a heat-recoverable sleeve on which the clip 2 is mounted, as hereinafter described with reference to FIG. 3. A slot 20 is defined along the length of each side of the leg 10 by upstanding portions 22, and the slots 20 are interconnected by a transverse slot 24 extending across the head portion 14 of the clip part 4.

The central leg 10 of the clip part 4 is coated with hot melt adhesive shown in dotted outline 25 around its entire surface, defining the channels 16 and 18 as longitudinally parallel gaps of width just sufficient to clamp the wall thickness of the associated sleeve, as described with reference to FIG. 3. It will be appreciated that the slots 20 extend into the adhesive 25, being open at the slot 24 and closed by the adhesive at their other ends. The part 6 of the clip 2 is generally planar and has four legs 26, 28, 30, 32 extending generally parallel to each other from a transverse head portion 34. Channels 36 and 38 are formed between respective pairs of legs 26, 28, and 30, 32, being tapered inwardly towards the head portion similarly to the channels 16 and 18 of the clip part 4. A further, straight-sided channel or socket 40 extends between the legs 28 and 30.

The parts 4 and 6 of the clip 2 are assembled (FIG. 2) by sliding the part 6 on to the part 4, with the part 4 located within the central channel 40 of the part 6. (The adhesive 25 is omitted for clarity). The legs 28 and 30 slide along respective ones of the slots 20, and the head portion 34 of the part 6 enters the transverse slot 24 of the head portion 14 of the part 4. In the partially-assembled position shown in FIG. 2, the head portion 34 of the part 6 has yet fully to enter the transverse slot 24 of the head portion 14 of the clip part 4.

Referring to FIG. 3, a heat-recoverable polymeric tubular sleeve 42 encloses a single telecommunications cable that is divided into four individual, smaller cables 44, 46, 48, 50 at a branch-off joint enclosed by the sleeve 42. The cables need not be of the same diameter. The clip 2 is mounted over the branch-off end of the sleeve 42, as shown, to divide that outlet of the sleeve 42 into four ducts, each containing a respective one of the cables 44, 46, 48 and 50. To do this, the cables 44 and 46 are separated from the cables 48 and 50, and the sleeve pinched together between the two pairs of cables. The clip part 4 is inserted into the end of the sleeve 42 with the channels 16 and 18 enclosing diagonally opposite portions of the circumference of the sleeve 42, and with the leg 10 extending into the sleeve 42, thereby forming two ducts containing the cables 44, 46 and 48, 50 respectively. The cables 44 and 46 are then urged towards cables 48 and 50 respectively, and the sleeve 42 pinched to the clip part 4. Part 6 of the clip 2 is then slid on to the clip part 4 as described above, with the inner legs 28 and 30 entering the sleeve 42 so as to sub-divide the ducts further, and to position each cable in a respective duct. As the clip part 6 is slid on to the clip part 4, the channels 36 and 38 are guided over diagonally opposite portions of the circumference of the sleeve 42. Thus the sleeve 42 is secured by the clip 2 at four circumferentially spaced locations around the cables 44, 46, 48 and 50.

After the clip 2 has been thus assembled on the sleeve 42, the sleeve is heated so that it tends to recover its original configuration and shrinks around the cables. The adhesive 25 on the clip 2 enhances sealing around the cables. During recovery, any tendency of the sleeve 42 to pull away from the cables is resisted by the clip 2. The tapering of the inner leg 10 and of the channels 36 and 38 allows the clip 2 to be urged properly into the crutch of the cables 44 to 50 adjacent the splice region itself.

The clip 2 is easy to manufacture, for example by moulding, and also since it comprises only two parts, is inexpensive.

Figure 4:
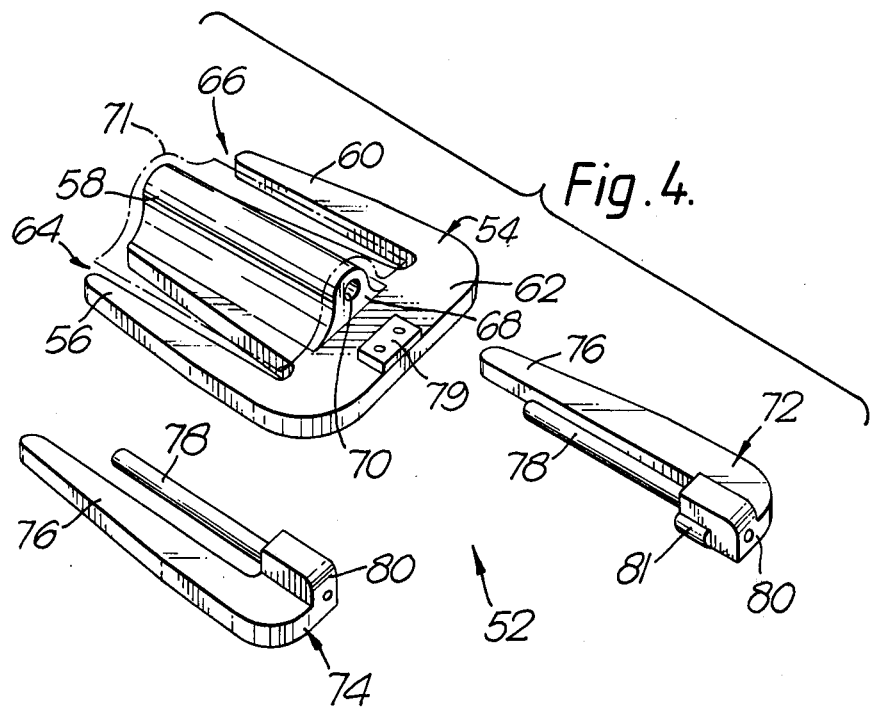
FIG. 4 is a perspective view of the parts of a second embodiment, which is a three part clip, before assembly.
Figure 5:
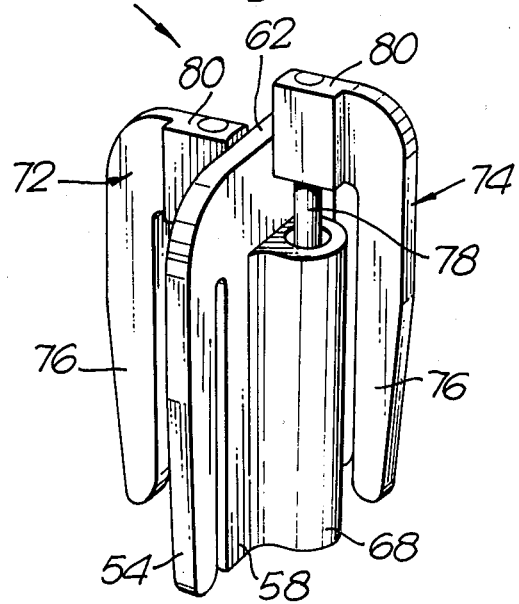
FIG. 5 is a perspective view of the almost-completely assembled clip of the second embodiment.

The clip 52 shown in FIGS. 4 and 5 has three parts, a first 54 of which has three legs 56, 58 and 60 extending generally parallel to each other from a head-portion 62. The leg 58 forms channels 64 and 66 with the legs 56 and 60 respectively. The central leg 58 of the clip 52 has one projection 68 extending from each side along the length thereof that has a socket 70 extending therewithin. The central leg 58 of the clip part 54 has one projection 68 extending from each side along the length thereof that has a socket 70 extending therewithin. The central leg 58 of the clip part 54 is surrounded with adhesive, 71, in a similar manner to that described for the first embodiment, so as to leave the channels 64 and 66 parallel for gripping the sleeve. The other two parts 72, 74 of the clip 52 are similar to each other, and each comprises a leg 76 and a spigot 78 extending in the same plane and generally parallel therewithin, being interconnected by a head portion 80. The spigots 78 are arranged to be slidably engageable within the sockets 70 of respective projections 68 on each side of the clip part 54, such that the legs 76 lie in a plane extending substantially perpendicularly to the plane containing the legs 54 and 56.

A block 79 extends from each major surface of the head portion 62 of the clip part 52 and is arranged to engage with a semi-cylindrical extension 81 of the head portion 80 of each clip part 72, 74. The clip parts 72 and 74 are slidably engaged with the clip part 52 whilst the legs 76 are at an angle different from 90° to the clip part 52 so that the extensions 81 may pass down beyond the blocks 79. The parts 72 and 74 are then rotated into their 90° orientation and are locked longitudinally to the part 52 by interengagement between the blocks 79 and respective extensions 81.

FIG. 5 shows the clip 52 with the adhesive 71 omitted and with the part 72 already completely engaged with one of the projections 68, and the part 74 only partially entering the socket 70 of the other projection 68.

It will be appreciated that the configuration of the assembled clip shown in FIGS. 4 and 5 is generally similar to the configuration of the assembled clip of FIGS. 1 and 2, and can be mounted within a sleeve such as the sleeve 42 of FIG. 3 in similar manner. The clip 52, however, may be easily assembled on the sleeve 42 in three stages, the first being the engagement of the clip part 54 on to the sleeve, followed by individual assembly of the two parts 72 and 74. Furthermore, once the clip parts are interengaged, separation during recovery of the sleeve is positively opposed.

Figure 6:
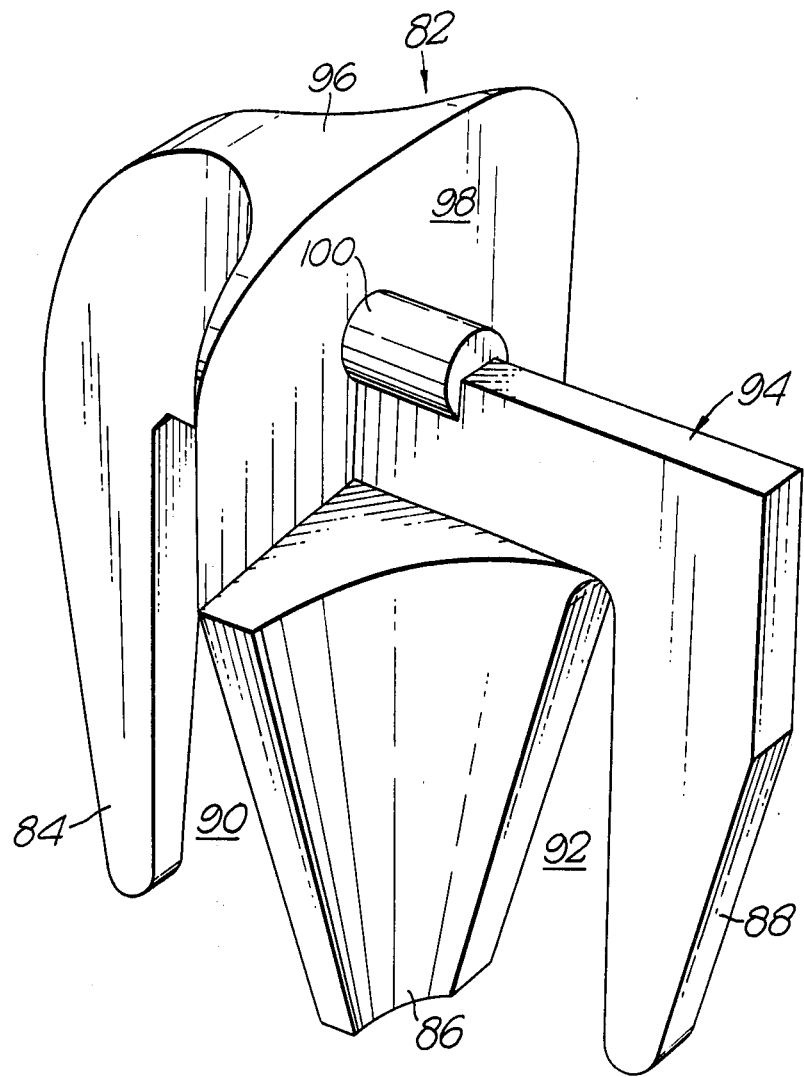

FIGS. 6 and 7 show the two parts of a further embodiment of a two part clip. Referring to FIG. 6, a first part 82 of the clip has three legs 84, 86 and 88 that define inwardly-tapering channels 90 and 92 between respective pairs of legs 84, 86 and 86, 88 for engagement of circumferentially-spaced portions of a heat recoverable sleeve. A bridge portion 94 connects the leg 88 at the closed end of the channel 92 over the end of the leg 86 to a head portion 96 of the part 82, terminating at a transverse planar face 98 thereof. The bridge portion 94 has a part-cylindrical upper surface 100 for interengagement with the other part 102 (FIG. 7) of the clip. The clip part 102 has two generally parallel legs 104, 106 interconnected by a head-portion 108. The head-portion 108 has a part-rectangular sectioned socket 110 that is shaped to slide laterally over the bridge 94 and its cylindrical surface 100 of the clip part 82 to dispose a planar face 112 of the clip part 102 in abutment with the planar face 98 of the clip part 82 and with the legs 104 and 106 forming respective channels on each side of the leg 86 of the part 82.

It will be appreciated that because of the part-cylindrical configuration of the interengagement of the bridge 94 of the part 82 and the socket 110 of the part 102, separation of the assembled clip parts longitudinally of the legs is prevented.

In use, the clip part 82 is mounted over the end of a heat-recoverable member such as the sleeve 42 of FIG. 3, with the leg 86 extending into the sleeve between the cables and with circumferentially-spaced portions of the sleeve disposed within respective channels 90 and 92. The clip part 102 is then disposed outside the sleeve 42 astride the leg 88 of the clip part 82. The part 102 is then urged towards the head-portion 96 of the part 82, to interlock the two clip parts and to dispose two further circumferentially-spaced portions of the sleeve 42 within the channels formed between the legs 104 and 106 of the clip part 102 and the leg 86 of the clip part 82. The sleeve is then shrunk down around the cables.

As can be seen from FIG. 6, the longitudinal surfaces of the central leg 86 of the clip part 82 disposed between the four outer legs of the assembled clip are concave, for example part-cylindrical, so as better to conform to circular-sectioned cables such as the cables shown in FIG. 3. Similar shaping of the inner legs of the clips 2 and 52 is also preferable, as shown.

FIG. 8 is an elevation of the assembled clip parts 82 and 102 showing the central leg 86 surrounded by hot melt adhesive 114, which provides the channels 90 and 92 as narrow parallel channels for gripping the sleeve.

The embodiment described with reference to FIGS. 6 to 8 is easy to manufacture by moulding, and is easy to install. Furthermore, there are no longitudinal channels extending along the entire length of the clip, thus eliminating any possible leak paths for moisture into the branch-off or splice within the recovered sleeve.

It is envisaged that other configurations of clamping member may be provided having two or more parts that can be assembled separately on to a sleeve. For example, the clip 52 of FIGS. 4 and 5 may have its outer legs 56 and 60 separable from a suitably-adapted central leg 58 in the same manner as the clip parts 72 and 74. Such a construction would allow the central leg of the clip to be inserted between cables within the sleeve at the branch-off and would allow the remaining legs to be added one at a time, simplifying the task of guiding circumferentially-spaced portions of the sleeve into the channels of the clip.

The clamping member may be formed from or covered with a material that has good chemical and/or electrical resistance.

It will be appreciated that the demountability of clips in accordance with the present invention facilitate their mounting at branch-offs, whereby the process of engaging circumferentially-spaced portions of the sleeve within channels of the clip does not have to be effected simultaneously.

This is of particular advantage where there is a large number, say four or more, of cables at the branch-off, or where cables being branched-off are of different sizes. Thus, it will be appreciated, for example, that the clip 52 may be preferred over the clip 2 in some circumstances.

Furthermore, the clip shown in FIGS. 6 and 7 may be used where forces on recovery of the sleeve tending to force the two parts of the clip apart longitudinally of the sleeve are relatively high, since this is prevented by the transverse interlocking between the bridge 94 and the socket 110 of the two parts.

Whilst the embodiment of clamping member described with reference to FIGS. 6 and 7 inherently has provision for locking the parts together longitudinally of the sleeve, it is envisaged that such locking could also be provided for the parts of other configurations of clamping member.

It is also envisaged that the parts constituting the clamping member may not be completely separable. For example, parts may be hinged or otherwise movably attached to each other whereby one part or some parts of the member may be fitted over a sleeve before the or other part or parts. With reference to the embodiment of FIGS. 6 and 7 for example, the part 102 may be arranged to slide away from the part 82 only to the extent necessary to allow the latter part to engage a sleeve without interference from the former part. A stop mechanism may be provided between the bridge 94 and the socket 110 for this purpose. With regard to embodiments such as those described with reference to FIGS. 1 to 5, it is preferable that the parts of the clip disengage longitudinally at least to a length approximately equal to the length of the overlap between the sleeve and the clip leg, for example the central leg, that extends into the sleeve.

What is claimed is:

1. A clamping member for use in forming a branch-off seal between a recoverable sleeve and a plurality of substrates extending from an end thereof, the clamping member comprising:
   at least two interengageable parts that extend generally parallel to each other, the parts being slidably interengageable and, when interengaged, providing at least five legs extending generally parallel to each other from a head of the member,
   the legs defining four generally parallel channels for receiving respective circumferentially-spaced portions of the sleeve with at least one of said legs extending into the sleeve to form therein at least four ducts for said substrates.

2. A clamping member according to claim 1, wherein each of said parts is substantially planar and one of the parts is arranged to slide over the other to effect the interengagement with the parts extending substantially perpendicularly to each other.

3. A clamping member according to claim 1, wherein each of said parts defines a pair of said channels, the channels of each pair being separated by means for effecting the sliding interengagement of the two parts of the clamping member.

4. A clamping member according to claim 1, wherein the parts thereof are slidable together in a direction substantially parallel to the direction in which the or each channel extends.

5. A clamping member according to claim 1, wherein the parts thereof are slidable together in a direction substantially perpendicular to the direction in which the or each channel extends.

6. A clamping member according to claim 4, additionally comprising means opposing disengagement of the parts in a direction generally parallel to the or each channel.

7. A clamping member according to claim 5, additionally comprising means opposing disengagement of the parts in a direction generally parallel to the or each channel.

8. A clamping member according to claim 1, wherein the or each channel tapers inwardly from an open end that is arranged to receive the sleeve towards a closed end of the or each channel.

9. A clamping member according to claim 1, wherein at least part of the or each surface defining the or each channel is roughened thereby to enhance gripping of the clamping member on the sleeve.

10. A clamping member according to claim 1, wherein at least part of the or each surface defining the other or each channel is covered by adhesive or sealant.

11. A clamping member according to claim 1, wherein the parts thereof are made from a thermally-conductive material.

12. A clamping member according to claim 11, wherein the material is aluminium.

13. A clamping member according to claim 1, wherein the parts thereof have at least an outer surface that is chemically and/or electrically resistive.

14. An assembly comprising a recoverable sleeve having at least two substrates extending from an end thereof and a clamping member according to claim 1, mounted on an end of the sleeve defining at least two ducts with at least one substrate in each duct.

15. A clamping member for use in forming a branch-off seal between a recoverable sleeve and a plurality of substrates extending from an end thereof, the clamping member comprising:

at least two interengageable parts, one of said parts has three substantially planar legs that define therebetween two channels extending generally parallel to each other; and at least one of said parts including a means for slidably receiving at least one of the other parts, wherein the means comprises at least one socket disposed out of the plane of the legs, thereby defining with said one part at least one other channel.

16. A clamping member for use in forming a branch-off seal between a recoverable and a plurality of substrates extending from an end thereof, the clamping member comprising:

at least two interengageable parts, wherein a first of the parts comprises two legs that define therebetween one channel, and a second of the parts comprises one leg that defines with the first part a further channel, the channels extending generally parallel to each other, and wherein one of said parts comprises a socket extending generally transversely of the channels and the other of said parts comprises a portion arranged slidably to engage within said socket to interengage the two parts, whereby said socket and co-operating portion oppose disengagement of said parts in a direction generally parallel to the direction of the channels.

* * * * *